J. & J. W. Higgins,
Clod Fender.
No. 96,234.   Patented Oct. 26, 1869.
Fig. 1,
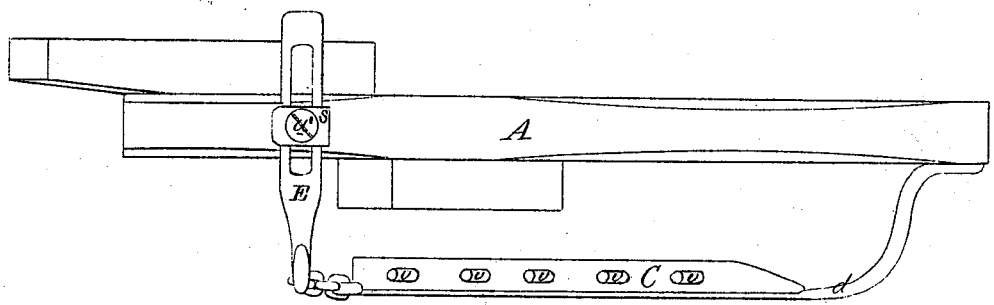
Fig. 2
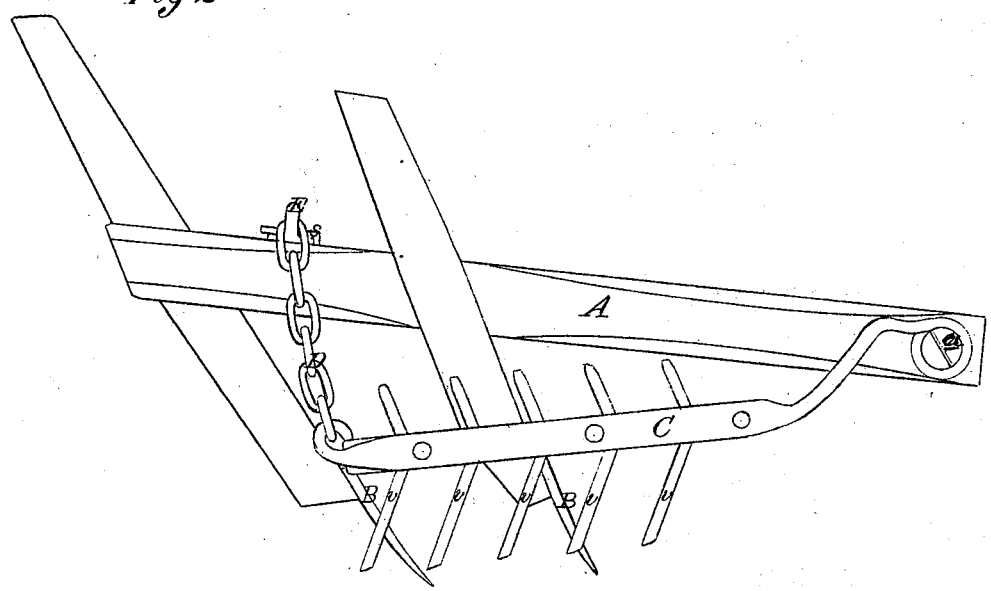
Witnesses
E. W. Anderson.
D. D. Kane
Inventors
Jas. Higgins,
John W. Higgins,
Chipman Hosmer & Co,
Attorneys.

UNITED STATES PATENT OFFICE.

JAMES HIGGINS AND JOHN W. HIGGINS, OF ORTH, INDIANA.

IMPROVEMENT IN PLOW CLOD-FENDERS.

Specification forming part of Letters Patent No. 96,234, dated October 26, 1869.

*To all whom it may concern:*

Be it known that we, JAMES HIGGINS and JOHN W. HIGGINS, of Orth, in the county of Montgomery and State of Indiana, have invented a new and valuable Improvement in a Plow Clod-Fender; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of our clod-fender, and Fig. 2 is a side elevation.

Our invention relates to means for preventing clods and stones thrown from the share of a plow from falling on the plants while the process of cultivation is being carried on; and it consists, mainly, in a novel arrangement of devices intended to accomplish the result named.

The letter A of the drawings represents a plow or cultivator beam, and letters B the plows thereof.

The letter C represents our clod-fender attached to the front end of the plow-beam by the screw $a$, that passes through the eye of its bent bar in the manner shown, and serves as a pivot therefor.

Our fender is constructed of a wooden beam, with apertures for holding the bent teeth, and also of an iron plate, $d$, bent at its front end, as shown, and having its plate portion firmly riveted to the beam. This plate and bar $d$ serve to strengthen the wooden beam, and to provide means of attachment to the plow-beam.

The letter D is a chain attached to the rear end of plate $d$, and also to the slotted bar E, as shown on the drawings, thereby permitting the fender to drag loosely upon the ground. The slotted bar E is arranged upon the plow-beam at the point shown, and at right angles therewith, and is held in place and made removable and adjustable by means of the set-screw and plate $s$.

The letters $v$ represent bent teeth, arranged in the openings in the manner shown on Fig. 2, both the lower and upper ends of which are turned rearward at an angle of about forty degrees, more or less. These teeth constitute a valuable substitute for the parallel and longitudinal bars in common use, and are, so far, improvements in that they are constructed at less cost than such bars, in that they serve, to some extent, as rakes in cultivating the ground, and projecting, as they do, above the main beam of the clod-fender allow the main weight of said fender to be brought near the ground, and thereby aid in securing for it steadiness and regularity of movement.

What we claim as our invention, and desire to secure by Letters Patent, is—

The clod-fender herein described, having wooden beam and bent plate, as specified, together with the bent teeth $v$, chain D, and adjustable bar E, constructed and arranged as set forth.

In testimony that we claim the above we have subscribed our names in the presence of two witnesses.

JAMES HIGGINS.
JOHN W. HIGGINS.

Witnesses:
JOHN W. ARNOLD,
JACOB BARKER.